Figure 1:
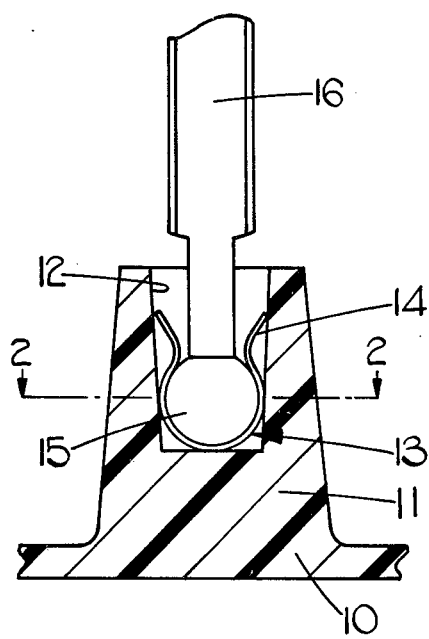

United States Patent [19]

Cranmore

[11] 4,194,850
[45] Mar. 25, 1980

[54] PIVOTAL MOUNTING ARRANGEMENT

[75] Inventor: John W. Cranmore, Birmingham, England

[73] Assignee: Lucas Industries Limited, Birmingham, United Kingdom

[21] Appl. No.: 961,873

[22] Filed: Nov. 20, 1978

[30] Foreign Application Priority Data

Dec. 2, 1977 [GB] United Kingdom ............... 50288/77

[51] Int. Cl.² .................. F16C 11/00; F16D 1/12
[52] U.S. Cl. ................ 403/140; 403/361; 403/365; 248/216.1
[58] Field of Search ............ 403/56, 76, 77, 90, 403/114, 115, 135, 140, 143, 165, 243, 276, 263, 361, 365; 248/216.1

[56] References Cited

U.S. PATENT DOCUMENTS

| 1,531,916 | 3/1925 | Flintjer | 403/276 |
| 3,107,111 | 10/1963 | Hager et al. | 403/361 X |
| 3,483,888 | 12/1969 | Wurzel | 403/143 X |

FOREIGN PATENT DOCUMENTS 44638 3/1916 Sweden ............... 403/143

Primary Examiner—Wayne L. Shedd
Attorney, Agent, or Firm—Trexler, Wolters, Bushnell & Fosse, Ltd.

[57] ABSTRACT

A pivotal mounting arrangement, which may be used for mounting a lamp on a vehicle body, comprises a plastics body having an integral boss provided with a hexagonal inwardly tapering recess therein. A socket element formed from a spring steel sheet has a cup-shaped central portion and six arms extending integrally upwardly therefrom. Outwardly projecting portions extend from the arm and the distance between opposed portions is greater than the corresponding dimension of the recess. A ball integral with one end of a screw-threaded rod is engaged in the socket element before the latter is forced fully into the recess. When disposed in position in the recess, the arms of the socket element are deformed inwardly and hold the ball captive whilst allowing same to rotate relative to the socket element.

This arrangement permits the boss to be formed out of a material which can be relatively rigid because the boss itself need not be resilient.

9 Claims, 7 Drawing Figures

PIVOTAL MOUNTING ARRANGEMENT

This invention relates to a pivotal mounting arrangement and is particularly, though not exclusively, concerned with a pivotal mounting arrangement for the pivotal mounting of a lamp on a vehicle body.

It has previously been proposed to provide a pivotal mounting arrangement for mounting a lamp on a vehicle body which comprises basically a ball and socket joint. It has further been proposed to mould the socket out of a plastics material which has a certain amount of resilience when the socket is moulded so that the ball can be snap-fitted into the socket. There is an increasing trend towards the manufacture of vehicle lamps, particularly vehicle headlamps, out of plastics material. However, such plastics material, being generally of a thermosetting nature, are relatively rigid and are therefore not suitable for the integral manufacture of such sockets since resilience is required to enable removal from the moulding tool. It is also generally difficult to rivet such plastics material effectively, so that it is unsatisfactory and uneconomical to form the socket out of metal or of a plastics material different from that of the lamp body and then to secure the socket to the body. This problem is particularly acute where the lamp body has an internal reflection surface since the provision of rivets or other fixing means is undesirable from an optical point of view and piercing of the lamp body can lead to moisture ingress which will damage the reflective surface.

Accordingly, it is an object of the present invention to provide a relatively simple pivotal mounting arrangement which does not have to rely on the manufacture of a socket made out of a material which has an unsatisfactory resilience when moulded to the shape of the socket.

According to one aspect of the present invention, there is provided a pivotal mounting arrangement comprising a member having a recess therein, and a socket element mounted in said recess, said socket element being formed of a resilient material, being adapted to receive and, when mounted in the recess, to hold a ball therein and having at least one outwardly projecting portion which engages against the wall of the recess and opposes withdrawal of the socket element from the recess.

Preferably, the socket element comprises a curved base portion and a plurality of arms which extend integrally away from the base portion so that the curved base portion and the arms together define a socket for receiving the ball, the arms having ends thereof remote from the base portion outwardly turned to define a plurality of said outwardly projecting portions. This form of arrangement is relatively simple to manufacture out of a sheet of metal.

Most conveniently, the recess has a polygonal cross-section and the number of arms of the socket element corresponds to the number of sides of the polygon. Conveniently, the recess is of hexagonal cross-section.

It is preferred for each of the arms to be linear across its width.

Preferably, the width of the socket element across mutually opposed outwardly projecting portions is greater than the corresponding dimension of the recess so that the projecting portions have to be deformed inwardly in order to insert the socket element into the recess. This serves further to assist in preventing unwanted withdrawal of the socket element from the recess.

In a highly preferred arrangement, the arrangement is such that the arms define a substantially nonre-entrant socket before the socket element is inserted into the recess and, when the socket element is inserted into the recess, the arms are deformed inwardly by engagement of the outwardly projecting portions with the wall of the recess so as to define a generally part spherical recess. The arrangement can therefore be such that the ball can be engaged with the socket element easily without being snap-fitted therein when the socket element is not engaged in the recess and the assembly of socket element and ball can then be forced into the recess so that the arms of the socket element close around the ball and retain it in position within the socket element. Thus, the pivotal mounting arrangement preferably further includes a ball mounted in the socket element.

Preferably, the or each outwardly projecting portion tapers substantially to a point.

According to another aspect of the present invention, there is provided a lamp comprising a body and at least one pivotal mounting arrangement according to the present invention, said body being moulded out of a plastics material and the recessed member of the pivotal mounting arrangement being moulded integrally with the lamp body.

The pivotal mounting arrangement for the lamp may be arranged to receive a ball attached to a post which is fixably secured relative to the vehicle body or it may receive a ball on the end of a screw-threaded rod adapted to be engaged with a screw-threaded element on the vehicle body.

Figure 3:
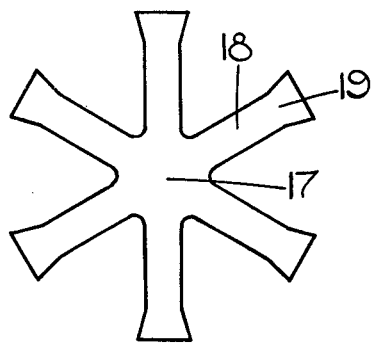
Figure 4:
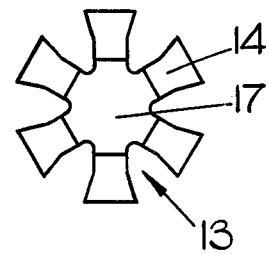
Figure 2:
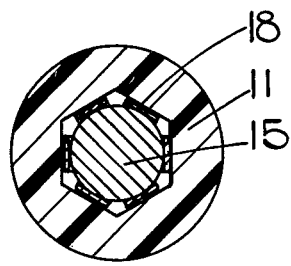
Figure 5:
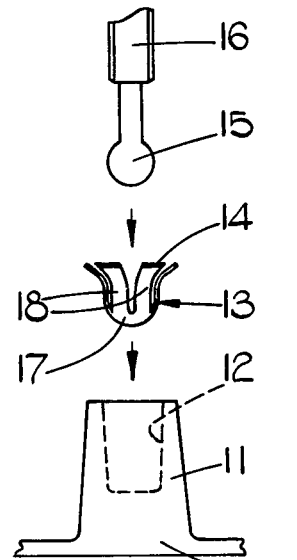
Figure 6:
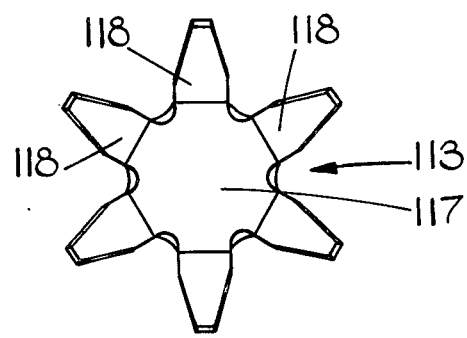
Figure 7:
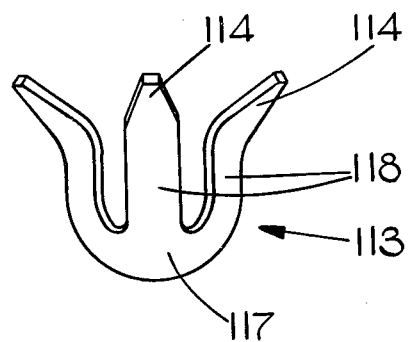

An embodiment of the present invention will now be described, by way of example, with reference to the accompanying drawings, in which:

FIG. 1 is an axial sectional view of one embodiment of pivotal mounting arrangement according to the present invention, FIG. 2 is a section on the line 2—2 of FIG. 1, FIG. 3 is a plan view of a sheet metal blank used to form a socket element forming part of the mounting arrangement of FIGS. 1 and 2, FIG. 4 is a plan view of the socket element, FIG. 5 is an exploded view of the arrangement of FIG. 1 showing the mode of assembly thereof, FIG. 6 is a plan view of another form of socket element, and FIG. 7 is a side view of the socket element of FIG. 6.

The pivotal mounting arrangement illustrated in the drawings is for a motor vehicle headlamp whose body 10 is only partly shown. The headlamp body 10 has an internal reflective surface and is formed of a low profile thermosetting polyester dough moulding composition by an injection moulding process in a manner known per se. The body 10 is provided with three pivotal mounting arrangements one of which is shown in the drawings. Each pivotal mounting arrangement comprises basically a boss 11 having an inwardly tapering recess 12 therein of hexagonal cross-section (see FIG. 2). Each boss 11 is integrally moulded with the lamp body 10 and is thus formed of the low profile, thermosetting polyester dough-moulding composition. Each pivotal mounting arrangement further includes a socket element 13 which is engaged in the recess 12 and is provided with outwardly projecting portions 14 which engage the sides of the recess 12 to oppose removal of the socket element 13 from the recess 12. Disposed within the socket element 13 is a ball 15 formed integrally at the end of a rod 16. For each of two of the pivotal mounting arrangements on the headlamp, the rod 16 is externally screw-threaded (as shown in FIG. 1) and is engaged with an internally screw-threaded element fixed relative to a vehicle on which the headlamp is mounted to enable axial adjustment of the rod 16 relative to the body. For the other of the pivotal mounting arrangements, the rod mounting the ball is not screw-threaded and is merely non-rotatably fixed relative to the body. Thus, the headlamp can be adjusted both vertically and horizontally by appropriate rotation of the screw-threaded rods 16.

The socket element 13 is formed from a blank of spring steel sheet which comprises a central portion 17 and a series of six arms 18 projecting radially therefrom. Each arm 18 has parallel sides and an outwardly flared portion 19 integral with its outer end. The portions 19 define, in the finished socket element, the outwardly projecting portions 14. In order to produce the socket element 13, the blank is subjected to a pressing operation which deforms the central portion 17 to part-spherical cup-shaped form and bends the arms 18 so that opposed arms extend substantially mutually parallel, the portions 14 being outwardly deformed. Then the resultant sleeve element 13 is hardened and tempered. In order to assemble the pivotal mounting arrangement, socket element 13 is inserted into the recess 12 until the portions 14 rest on the top edge of the boss 11 around the recess. The ball 15 is inserted into the socket element 13 so that it engages against the inner surface of the central portion 17. No force is required to insert the ball 15 into the socket element 13 because, at this tage, the socket defined by the portion 17 and the arms 18 is non-re-entrant. Then the assembly of ball 15 and socket element 13 is forced into the recess 12. As can be seen from FIG. 5 the width of the socket element 13, across mutually opposed outwardly projecting portions 14 is greater than the corresponding dimension of the recess 12. Thus, when the assembly of ball 15 and socket element 13 is forced into the recess 12, the outwardly projecting portions 14 are deformed inwardly so that the arms 18 are deformed around the ball 15 so as to provide a re-entrant socket (see FIG. 1). This operation thus locks the ball 15 in the socket element 13. The rearward direction of projection of the portions 14 relative to the direction of insertion of the socket element 13 into the recess 12 means that the projections 14 can be readily deformed inwardly during insertion but dig into the walls of the recess 12 if a force in the opposite direction is applied. Thus, the ball 15 is held firmly within the recess 12 and universal pivotal movement within limits between the boss 11 and the ball 15 is permitted. As can be seen from FIG. 2, the arms 18 are linear across their width. This, together with the outwardly flared shape of each portion 14, means that the risk of relative rotation between the boss 11 and the socket element 13 is minimised. The use of arms 18 which are concavely curved across their width so as to conform widthwise to the external surface of the ball 15 is not preferred because (i) the side edges of such curved arms have a tendency to dig into the ball 15 and to cause scoring of the latter, and (ii) such curved arms tend to be unduly resistant to inward deformation thus making it difficult to insert the socket element 13 into the recess 12 without damage to the boss 11.

Referring now to FIGS. 6 and 7, the socket element 113 illustrated therein is similar to the socket element 13 previously described in that it consists of a central portion 117 and six arms 118 formed from a blank of spring steel sheet. The element 113 also has outwardly projecting portions 114. However, unlike the portion 14 of the socket element 13, each portion 114 tapers substantially to a point at its end remote from the central portion 117. In use, instead of being orientated so that the portions 114 lie against the sides of the hexagonal recess 12 in the boss 11, the portions 114 lie in the corners between the sides of the recess 12. The pointed nature of the portions 114 assist in preventing unwanted withdrawal of the element 113 from the recess 12 because the portions 114 have a greater tendency to dig into the internal surface of the boss 11 than the portion 14 when a withdrawal force is applied to the element 113.

I claim:

1. A pivotal mounting arrangement comprising a member having a recess therein, and a socket element mounted in said recess, said socket element being formed of a resilient material, being adapted to receive and, when mounted in the recess, to hold a ball therein and having at least one outwardly projecting portion which engages against the wall of said recess and opposes withdrawal of said socket element from said recess.

2. The arrangement according to claim 1, wherein said socket element comprises a curved base portion and a plurality of arms which extend integrally away from said curved base portion so that said curved base portion and said arms together define a socket for receiving said ball, said arms having ends thereof remote from said base portion outwardly turned to define a plurality of said outwardly projecting portions.

3. The arrangement according to claim 2, wherein said recess has a polygonal cross-section and the number of said arms of said socket element corresponds to the number of sides of the polygon.

4. The arrangement according to claim 3, wherein said recess is of hexagonal cross-section.

5. The arrangement according to claim 2, wherein each of said arms is linear across its width.

6. The arrangement according to claim 1, wherein the width of said socket element across mutually opposed outwardly projecting portions is greater than the corresponding dimension of said recess so that said projecting portions have to be deformed inwardly in order to insert said socket element into said recess.

7. The arrangement according to claim 2, wherein said arms define a substantially non re-entrant socket before said socket element is inserted into said recess and, when said socket element is inserted into said recess, said arms are deformed inwardly by engagement of said outwardly projecting portions with said wall of said recess so as to define a generally part-spherical recess.

8. The arrangement according to claim 1, including said ball which is mounted in said socket element.

9. The arrangement according to claim 1, wherein said outwardly projecting portion tapers substantially to a point.

* * * * *